US009369439B2

(12) United States Patent
Gomez Hernandez et al.

(10) Patent No.: US 9,369,439 B2
(45) Date of Patent: Jun. 14, 2016

(54) METHOD FOR INTERNET TRANSACTIONS (75) Inventors: Jaime Enrique Gomez Hernandez, Bogotá (CO); Carlos A. Perry Peinado, Bogotá (CO); Wilmer Linares Montañes, Bogotá (CO); Ivan Dario Tovar Rueda, Bogotá (CO)

(73) Assignee: Azuan Technologies S.A., Bogotá (CO)

( * ) Notice: Subject to any disclaimer, the term of this patent is extended or adjusted under 35 U.S.C. 154(b) by 0 days.

(21) Appl. No.: 14/113,824

(22) PCT Filed: Mar. 15, 2012

(86) PCT No.: PCT/IB2012/051260
§ 371 (c)(1),
(2), (4) Date: Jan. 10, 2014

(87) PCT Pub. No.: WO2012/146987
PCT Pub. Date: Nov. 1, 2012

(65) Prior Publication Data
US 2014/0137196 A1  May 15, 2014

(30) Foreign Application Priority Data

Apr. 26, 2011 (CO) .................................. 11-050985

(51) Int. Cl.
*G06Q 20/00* (2012.01)
*H04L 29/06* (2006.01)
(Continued)

(52) U.S. Cl.
CPC ................ *H04L 63/04* (2013.01); *G06F 21/53* (2013.01); *G06F 21/57* (2013.01); *G06F 2221/2127* (2013.01)

(58) Field of Classification Search
USPC .......................................................... 705/64
See application file for complete search history.

(56) References Cited

U.S. PATENT DOCUMENTS 5,974,549 A * 10/1999 Golan ............................ 726/23
6,199,181 B1 * 3/2001 Rechef .................... G06F 21/53
714/38.13

(Continued)

OTHER PUBLICATIONS

Nachenberg, Cary. "A Window Into Mobile Device Security." Symantec Corporation. 2011. 23 pages. http://www.symantec.com/content/en/us/about/media/pdfs/symc_mobile_device_security_june2011.pdf.

*Primary Examiner* — John Hayes
*Assistant Examiner* — John M Winter
(74) *Attorney, Agent, or Firm* — The Morales Law Firm, LLC; Joseph L. Morales (57) ABSTRACT

The present invention consists of a computer security method that enables all users of a computer application to enjoy superior security levels when sensitive information is being exchanged with transaction applications. The method of the present invention consists of developing a virtual desktop or isolated execution environment that restricts the user to working in a specific zone. Said virtual desktop or isolated environment is programmed in such a way that message listening techniques such as hooking or quartz techniques are implanted for intercepting messages between the transaction application, such as the electronic bank, and the user's Operating System (OS). The method that is used in the present invention also blocks special key combinations in order to prevent malicious code execution in OS support devices, like Apple® IOS and Google™ Android, where special key combinations are not evident, but combinations such as "*#06#" exist.

17 Claims, 8 Drawing Sheets

(51) Int. Cl.
*G06F 21/53* (2013.01)
*G06F 21/57* (2013.01)

(56) References Cited

U.S. PATENT DOCUMENTS

| | | | |
|---|---|---|---|
| 6,384,853 B1* | 5/2002 | Shaffer et al. | 715/867 |
| 6,513,071 B2 | 1/2003 | Madl et al. | |
| 7,224,344 B2* | 5/2007 | Crockett et al. | 345/168 |
| 7,328,453 B2 | 2/2008 | Merkle et al. | |
| 7,694,328 B2 | 4/2010 | Joshi et al. | |
| 7,725,737 B2 | 5/2010 | Konanka et al. | |
| 7,908,652 B1 | 3/2011 | Austin et al. | |
| 2002/0099825 A1 | 7/2002 | Fertell et al. | |
| 2003/0200453 A1* | 10/2003 | Foster et al. | 713/200 |
| 2004/0236874 A1 | 11/2004 | Blair et al. | |
| 2007/0174429 A1 | 7/2007 | Mazzaferri et al. | |
| 2009/0249368 A1* | 10/2009 | Needamangala et al. | 719/328 |
| 2009/0319782 A1 | 12/2009 | Lee | |
| 2010/0005531 A1 | 1/2010 | Largman et al. | |

* cited by examiner

METHOD FOR INTERNET TRANSACTIONS

This application is a National Stage Entry of International Application No. PCT/IB2012/051260, filed Mar. 15, 2012, which claims priority to Colombian Patent Application No. 11-050985, filed on Apr. 26, 2011, the specifications of which are incorporated herein by reference in their entirety.

1. INVENTION FIELD

The invention relates in general terms to computers and data processing applications, and more particularly to the system and methodology for providing end users in transaction applications with a secure working environment.

2. BACKGROUND

The use of virtual services such as online purchases and the carrying-out of electronic transactions by this same means have led to cyber-criminals specialising in the development of malware which attacks users of these services in a selective manner.

The proliferation of viruses, worms, Trojans and all kinds of malware that specialize in stealing information from the end users of electronic services has resulted in many companies recommending their users to access these services only from fully-identified points, networks and equipment, so as to thereby reduce risks to the greatest extent possible. Unfortunately, these measures are not very useful because users go on using their equipment without any administration or control by the companies that offer electronic services. This means that when they access the services, their equipment could be at risk of being infected or could already be the victim of some type of spyware that is stealing all the users' information.

In most cases, end users of electronic services are not aware of the risks that exist when they carry out their transactions, especially via the Internet (this does not mean that risks do not exist in isolated environments). This explains why, when users see how easy it is to use shared networks (WLAN at airports, for example), they carry out transactions where they openly exchange sensitive information in these types of environment. This is where these users' computer equipment is most vulnerable because they do not know the risks that are inherent in the mere fact of using these networks, which generally give unlimited access to their equipment. This means that it can be infected with any type of spy software that waits for the right moment to execute its theft commands and send sensitive information to a third party.

In addition to the use of unsafe networks for exchanging sensitive information online, unknown computer equipment is also used (Internet cafés, for example), which could have been manipulated by more than one user during its useful life, thereby increasing the risk of infection and making it more likely that the equipment is infected with some type of spyware.

A further interesting point, and one that is becoming more and more common, is the use of social engineering techniques. Although this problem is outside the technological field, it is much more worrying than any other as it is the way that most information is lost, which is then subsequently used to commit offences in the name of third parties.

Companies that provide computer services have concentrated on guaranteeing their investment, that is, their equipment. When attacks commence, they set out to damage the companies' servers so that they cannot provide their services, take them offline, and in the worst case scenario, supplant them and thus be able to steal information.

Companies' policies tend to restrict users to known access scenarios, limiting the convenience they would otherwise enjoy of using the services anywhere and through any network and thus eliminating the very aim of mobile technology.

Companies' user education policies make the end user responsible for access point security (user computer equipment, network used, etc.). Actions such as using and maintaining an antivirus (keeping lists up-to-date, using licensed software, and other restrictions) are advised, but not controlled by companies. This is why users continue having fraud problems. Most of users are not knowledgeable enough to make use of the best practices recommended by companies that provide them with their electronic services.

The technology industry has made a positive contribution towards users getting a growing sense of security. One of the most widely-accepted security methods is using tokens, or One-Time Passwords (OTP). An OTP is a tool that aims to improve user security levels at the point of authentication and when information is exchanged with computer applications.

These tokens are an important tool, but they have a series of disadvantages, mostly related to the logistics of administering them, since they represent a cost for companies and in most cases this cost is passed on to end users who, in turn, are unwilling to bear it. Furthermore, malware, which specialises in these devices (more precisely, in stealing the password they generate), has been developed over the last two years, meaning that this technology is no longer a mechanism that marks the difference in terms of end user security because the password can now be reproduced without users realising. By way of example, there is a type of malware called ZeuS, which possesses a large family of executable files that specialise in stealing these passwords, and it has therefore become a great success in the information theft field.

Another security method that is widely used by end users in computer transactions is antivirus software. The most serious problem with this is that it is unable to provide protection against unknown viruses. This enables new viruses to have a window of exposure—i.e. a period of time during which they can spread rapidly before the antivirus software is adapted and updated in order to detect their existance and stop them. Based on the matters described in this document, products exist on the market that aim to provide security of information solutions at the end point, namely the equipment used by the user of the transaction applications. These products include anti-malware suites; antivirus software such as Symantec's Norton Antivirus™, Panda Antivirus™ by Panda Software, Kaspersky's Kaspersky Anti-Virus™, Avira's Avira Antivirus™, Avast™, etc. And in the field of anti-spyware, software which fights spy software includes Ad-Aware SE Personal™, Spybot—Search & Destroy™, and SpywareBlaster.

There are also software programmes that allow information to be made secure when Internet browsers are being used, such as ZoneAlarm™ by Checkpoint. In addition to combining antivirus and anti-spyware, these browsers have a security arrangement for them not to permit software of the type known as loggers to be executed while the browser is being used. However, as mentioned above, these programmes are aimed at users who want to make their information secure and are not provided by companies that advertise their services online. Thus leaving millions of users without protection, even if only partially, because they do not have the technological means or knowledge to implement any of these solutions or cannot afford to do so. It should also be pointed out that most of these solutions are only partially effective.

Other solutions, such as the one mentioned in document U.S. Pat. No. 7,725,737B2 which belongs to Check Point Software Technologies, Inc., describe the procedure for providing security at the end point of a transaction. The method creates a secured workspace within an existing operating system for allowing users to run applications in a secured manner, based on a series of policies that can be configured by the user himself. The use of hooks manages certain communications between applications and the Operating System (OS). Information generated within the secured workspace is encoded, so that it can only be viewed from there.

The U.S. Pat. No. 7,725,737B2 describes a method for providing security that is aimed at the whole range of existing electronic devices although it refers directly to how to construct secure applications only in computers with a Windows™ OS. This method allows for the possibility of configuring security levels, thereby enabling transactions carried out under this configuration to be infected by malware and the system in which the method is being executed to thus be rendered insecure. The use of the method in the user's equipment requires the installation of administrator permits for the transactions to be carried out. If the user of the equipment does not have these permits, the method cannot be used.

Everything executed in the secured workspace described in the method is encoded and stored, and this could allow hackers to reconstruct information that is on the disc and also seriously affect equipment performance, thus in turn affecting the experience of the end user. This method also requires an external component to validate the minimum policies required for executing the secured workspace, thereby limiting the possibility of implementing the solution only for corporate sectors, where the end connection points possess a control level from the company which provides the transaction application service.

The method described in the present invention, on the other hand, does not give the user the power to choose his security levels eliminating any possibility of attacks on the end user. When users are able to manipulate security levels in an application, these levels are generally not the best ones for the end user's needs because he (the user) does not have the necessary technical knowledge to establish the most appropriate security configuration for his equipment. Not allowing the user to configure security allows the company that implements the method proposed in this invention to have a lower risk margin than that provided by other methods, where users configure their own security.

Among the widely-known methods for providing security at the end point in a transaction is the virtualisation of services and complete OS, where the malware residing in the normal user setting does not attack the virtual environment. Two examples of this method are described in documents US2004/0236874A1 and US2010/0005531A1. These patents disclose how a complete virtualisation of an alternative OS to the user's original is performed which is capable of existing side by side and being executed at the same time as the end user's original OS. These methods, which are well-known in the industry for their efficiency in protecting users, cannot be implemented in any environment. The hardware in users' equipment needs to have certain technical characteristics in order to meet the minimum requirements that these methods demand. The user also needs to have a relatively high level of knowledge in order to configure the virtualisation methods, since carrying out a virtualisation of an OS is much more complex than doing the same thing with a service. Virtualisation of an OS also requires a series of physical resources, such as hard disc storage, a major portion of the RAM memory for executing it, and interfaces (drivers or controllers) which enable various peripheral devices to be used, such as a keyboard, cursor, or even printers. These resources are generally limited for end users, since they do not have equipment with such a high computing capacity.

The concept of providing security changes with mobile devices, as a result of the end user application delivery strategies. In the specific case of the Apple IOS and the Google™ Android, the manufacturers of these OSs have taken special care to offer a secure environment of their own instead of leaving the user in the hands of third parties to guarantee their security, according to a recent study conducted by Symantec in June 2011[1].

The threats to the security of users' sensitive information in mobile devices are hard to exploit and correct because they occur less often than in PCs, as a result of the control that is exercised by the manufacturers over the applications they deliver to end users. However, this does not mean that hackers cannot obtain information from the end users. Apple, for example, is one of the manufacturers that has taken the most care with security in its mobile devices, by defining a series of policies and conditions for creating applications that are executed in those devices. In the case of Apple, five (5) standards have been established which have to be verified before an application can be available to users, namely:

(i) traditional access control, access via password and blocking screen with timer, (ii) application origin, which means that the creator and publisher of the application are checked, (iii) data encoding, with each application being required to encode the information it administers so that others are not capable of reading it, (iv) isolation of applications, where applications cannot share execution spaces; in other words, they cannot share RAM memory, meaning that applications cannot access information that is being executed in another scenario, and (v) access control via permits (that is, administering access by applications to information through permits and blocking if an attempt is made to exceed the limit).

4. BRIEF DESCRIPTION OF THE INVENTION

This present invention consists of a computer security method that enables all users of a computer application to enjoy superior security levels when sensitive information is being exchanged with transaction applications. Any user (without the need for advanced technological knowledge) can carry out electronic transactions, from anywhere and using any type of network, in the knowledge that there is a very low risk of his information being stolen or compromised.

The method used in the present invention consists of developing a virtual desktop or isolated execution environment that restricts the user to working in a specific zone. Said virtual desktop or isolated environment is programmed in such a way that message listening techniques such as hooking or quartz techniques are implanted for intercepting messages between the transaction application, such as the electronic bank, and the user's Operating System (OS). The method that is used in the present invention also blocks special key combinations in order to prevent malicious code execution in OS support devices, like Apple® IOS and Google™ Android, where special key combinations are not evident, but combinations such as "*#06#" exist, which shows the IMEI number of the device and more importantly the multi-touch answers. When the virtual environment or desktop is launched, applications that are executed during the session will be executed in an isolated, secure environment.

When the application is being used, the next step is generating trash events in the user's OS. When the user decides to end the secure session, the original desktop returns and the user can go on using his equipment in the normal manner.

Using various known techniques for providing security is what determines the success of the method used in the present invention. Techniques like creating virtual environments or desktops and implanting message listening techniques, such as hooks, are used in other existing methods in the art for providing security, but generally separately, which makes them vulnerable to cyber attacks. Similarly, none of the characteristics described in the method of the present invention can be removed, adjusted or configured by the user. This guarantees that the company that provides the transaction services does not run the risk of seeing the security it provides reduced by the user or as a result of malware that is present in the equipment that is intended to be used for carrying out the transaction.

In mobile devices, like those based on Apple® IOS and Google™ Android, the method used in the present invention creates an isolated environment that is based on the very restrictions existing in their OS, and this only allows functionalities inherent in the application or agent (in PCs and Mac, the virtual desktop) to be executed. The method that is used for these devices in this invention can therefore be summarised as consisting of creating a specific agent that functions specifically in these devices and implants techniques that register user I/O messages to the agent constructed for the device and subsequent use by a restricted browser or web search device, as happens in PC and Mac-type systems.

Unlike the prior art above described, the present invention does not need any special hardware or software characteristics for it to be executed. Likewise, users do not have to learn how to carry out complicated configurations or installations in order to ensure that the security methods function effectively. The method of the present invention does not require any policy verification by a third party that could be infected and later attack end users. The method for providing security of the present invention does not need anything to be installed in the user's equipment. It is the transaction application that delivers the security model, and the user therefore does not have to notice this.

The method of the present invention enables computer applications, where sensitive information is exchanged, to be secure anywhere because of its delivery methods, the way in which it operates and the number of users that can use it. In other words, when the present invention is implemented, any computer equipment that is used from any network will function as a secure network/item of equipment when information is exchanged or throughout the period of time that the application is being executed, should this be desired, adhering to and in many cases even exceeding the security specifications recommended by transaction application suppliers.

5. DETAILED DESCRIPTION

Glossary

Transaction End Point. This refers to the hardware item that the transaction is being carried out from. It is called the end point because it is the last device, starting from the server that is the origin of the information, on which the application that is to be used is displayed.

Hooking. In computer programming, the word 'hooking' covers a wide range of techniques that are used for modifying or augmenting the behaviour of an OS, applications or other software components by intercepting function calls or messages or events between software components. The code that these function calls, events or messages use is called a hook.

Hook. A hook is a point in the message management system mechanism where an application can install a sub-routine in order to control message traffic in the system and process a certain type of message before it reaches the destination window procedure.

Quartz. In systems other than Windows, more precisely in systems that are executed in mobile devices, these function in the same way as hooks. They are a message management system mechanism where an application can install a sub-routine in order to control message traffic.

I/O. In computing, input/output (I/O) refers to communication between an information processing system (such as a computer) and the outside world, perhaps a human being or possibly any other information processing system. Inputs are the signals or data received by the system, and outputs are the signals or data sent from that same system. The term can also be used as a verb, to describe part of an action (e.g. "do I/O", to refer to performing an input or output operation). I/O devices are used by a person (or by another system) to communicate with a computer. For example, a keyboard or mouse can be an input device for an item of equipment, while monitors and printers are considered to be computer output devices. Devices for communication between computers, such as modems, can generally be used for both input and output.

Shortcuts. This expression refers to key combinations in an OS which call up an application or allow particular operations to be accessed when they are keyed in by the user on a computer keyboard.

Clipboard. The clipboard is a software installation that can be used for storing data in the short term and/or for transferring data between documents or applications by means of copy-paste operations. It is part of a graphic environment and is normally implemented as an anonymous, temporary memory block that can be accessed from most programmes through defined programming interfaces.

Antivirus List. Antivirus system updates are usually based on a file (list) that is retrieved remotely from the antivirus manufacturers' servers. This list contains system updates to prevent new vulnerabilities that have been processed by the manufacturer and that the antivirus can now intercept.

Agent. In computing, a software agent is a software item that acts in an agency capacity or relationship with a user or other programme (it is derived from the Latin word agere—to do: an agreement to act on behalf of a third party). These "actions on behalf of" imply that authority exists to decide what action is best. The idea is that agents are not strictly called upon for a task, but can activate themselves.

Kernel. In computing, the core, or kernel, is the central component in most OSs; it is a bridge between applications and the processing of real data at hardware level. Kernel responsibilities include the administration of system resources (communication between hardware and software components).

Client Application. Client application refers to an application, programme or executable file, which can be a web browser, a desktop server client application, or any application that it is wished to protect.

Virtual Desktop. This is an alternative work environment to the one the user knows and normally uses. This environment is implemented in the user's own equipment, and no server component is needed to act as service "virtualiser."

Detailed Description

The claimed method provides a virtual desktop or environment that is isolated from the environment in which the user works, where access to default functionalities in the OS is not available. Message listening techniques (hooking on Windows OS and Quartz on other OSs) are implanted on this virtual desktop, so that I/O messages between the transaction application and the end user's OS can be intercepted. These hooking or Quartz techniques execute processes that block special key combinations; block all quick accesses to functionalities or shortcuts and deactivate the clipboard. When the user scenario has been made secure, it is available for executing a client application. Once the secure environment has been executed, a programme called trash generation engine (which will be explained later) is implemented. When the user decides to end the transaction or to terminate the application, the virtual desktop is dismantled and the primary desktop is restored, so that the user can continue to use the equipment in the normal way.

The method used in the present invention can be implemented in a wide range of electronic devices, such as a computer or a laptop (with Microsoft Windows Operating Systems), or UNIX, Linux, MacOS, Novell, etc. environments. In other preferred modalities, the method is implemented in Microsoft Operating Systems in the NT x86, x32, x64 family, all existing Apple MacOS Operating Systems, and all versions of Apple IOS for IPhone/IPod Touch/IPad devices. It can also be implemented in a personal data assistant, a personal data organiser, a cell phone, a mobile phone, an internet browser device, an electrical appliance or a smartphone. In the case of environments where implementation is in desktop computers or laptops, the description of this invention is aimed at client computer equipment that works on Microsoft™, Apple® MAC OS Operating Systems and smart mobile devices such as Apple® IOS and Google™ Android.

Companies can implement the security method of the present invention in applications they already possess, merely by adding the steps when exchanging sensitive information with the user. In the case of computer applications in client/server type architectures, computer programmes predefined by the applications supplier are executed, which should be housed in the end user's equipment.

A restricted web browser will be executed in cases where the invention method is aimed at delivering web architecture applications. However, it should be understood that the method of the present invention is aimed at any type of application where an isolated environment is required for exchanging information both at local level (user computer equipment) and via the internet. Following with the example of web browsers, it is common knowledge that these have secure execution methods where browsing, interaction with content, downloading and other end user functions are restricted and operate on the basis of security methods like behaviour lists, which constitute good practice when surfing the internet. The method used in the present invention does not need lists or behaviour analyses for detecting spy or malicious software in the user's computing equipment, since the aim of the claimed method is not to alert the user about security problems he could be exposed to, but rather to take him to a secure environment where he can exchange information with the computer application without any danger of a third party hacking that information.

Implementation of the method for providing security of the present invention has a minimal effect on the final user's software and hardware performance. This is achieved by concentrating the use of the claimed method only on points in time when sensitive information is exchanged with computer applications. With the method of the present invention, the end user does not need to concern himself with acquiring software, hardware or special devices for using it since it can be delivered, in one of the preferred embodiments, through known software distribution files such as .exe, .jar or .dmg files, or preferably ActiveX™ controls and Java™ Applets.

Figure 1:
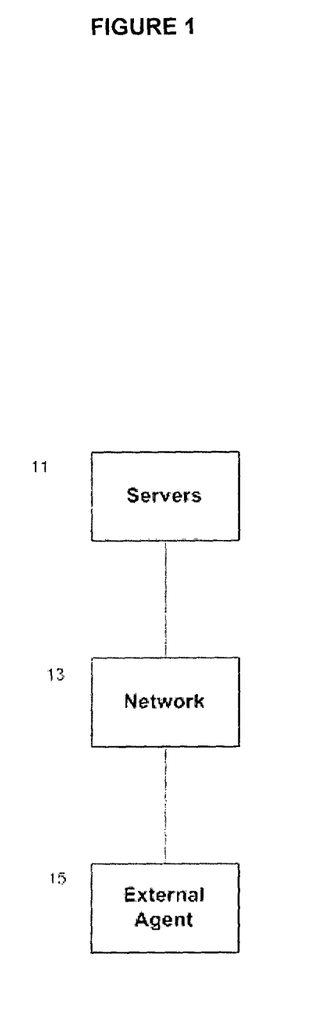
FIG. 1 is a block diagram showing the three main components for transaction applications.

Referring to FIG. 1, the method of the present invention allows companies to control the three components involved in the information exchange: (i) their servers (11), which are protected from their data centres, (ii) the network (13), which is provided with security through technological computer methods, and (iii) the external agents (15), which are the end access points from which the security provision method of the present invention is displayed.

Continuing with FIG. 1, providers of services like e-Commerce, e-Learning, email, SaaS, Cloud Computing, etc. are in the computing networks consisting of servers (11), together with the network (13) from the Internet (the most desirable case), business environments or small networks, and finally any external agent (15)—which can be the back-end of a company, client computers or software—that provides transaction services, where the method described in the present invention will operate. Unlike traditional methods for detecting and correcting security problems, the method of the present invention does not use server components for monitoring, registering or auditing content or execution behaviour. As already specified, this solution only operates at the time information is exchanged or when the computer application supplier so wishes.

Figure 2:
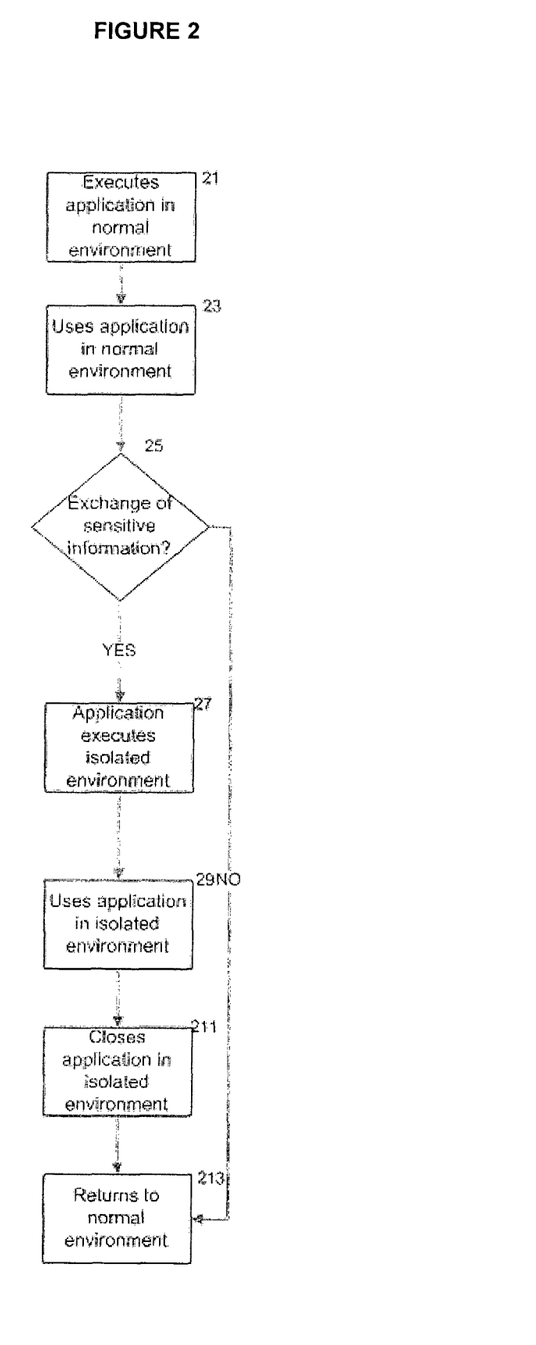
FIG. 2 is an arrangement for using any application, showing the point at which the isolated environment is generated.

Referring to FIG. 2, the method used in the present invention begins to function from an unprotected environment (21) where any application is executed (web search engines, business applications, etc.) (23). Acting on an instruction from an external agent (e.g. a user), the method of the present invention makes the computer application that the user wants to work with start a sensitive information exchange process (25) by granting access to APIs (Application Programming Interface—API—for creating processes, CreateProcess) in order to create the isolated environment (27). This API access action can be carried out by giving users agents (software) that are executed when information is exchanged, or using technology like ActiveX™ or Applets, which can access OS functionalities. The secure or isolated environment does not interact with parts of the system that are not needed for the transaction, with the result that the method used in the present invention does not allow either other applications that are being executed in the system to see functions of the protected application or the protected application to see or access the functions of other applications, thereby guaranteeing it is not compromised by the various latent risks in the system. Various computer techniques that are fully understood in the computer technology field need to be used for creating it. These series of techniques are based on using Windows™ APIs for creating, managing and destroying the isolated environment, such as installing special configurations or agents in end user's browser (if the application that wants to deliver this method is the web), without any need for the end user to be involved in the process. In the case of Windows™ OS APIs, access is obtained to all OS functionalities, including kernel functions, such as interfaces between existing computer applications. Methods are similar with systems other than Windows™, such as Apple® MacOS, Apple® IOS, Google™ Android, etc. since the APIs in each of those systems are used. These APIs provide the same functionalities as those provided by Windows™, although some have certain restrictions, such as the need to execute as system administrator.

When use of the application in the isolated environment ends and the application shuts down (211), the same APIs are used in the process of eliminating all components used in establishing the secure environment. When this process is completed, the user is given back his normal work environment (213) or default desktop.

Figure 3:
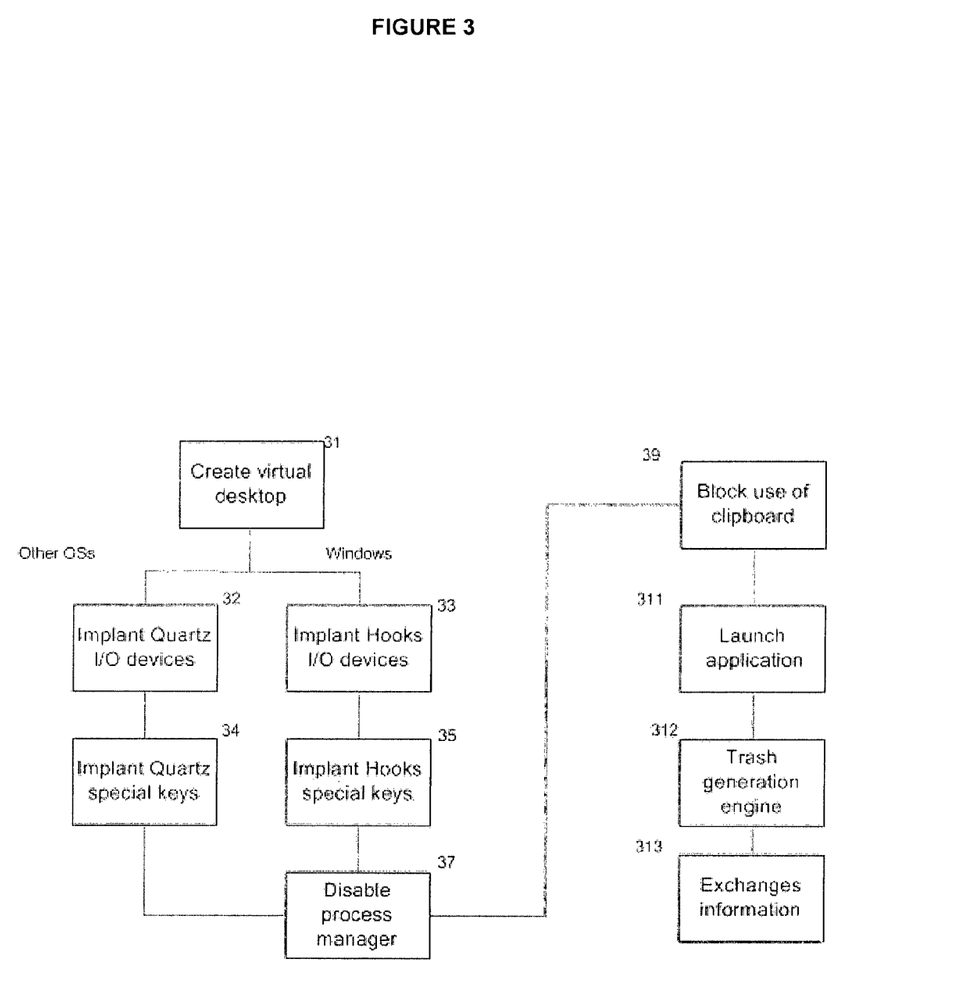
FIG. 3 shows the steps involved in generating an isolated environment for exchanging information.

FIG. 3 describes the steps involved in generating an isolated environment for exchanging information. When the information exchange starts, the computer application creates a virtual desktop or environment (31), using the system's APIs for this. It is in this environment that the applications, services and functionalities needed for exchanging information with the user will be executed. The virtual environment that has been created allows all system messages that reach the virtual desktop to be controlled because hooks have been implanted for I/O devices in Windows OS (33), Quartz (32) in the case of other systems, after which additional hooks are implanted for managing key combinations called shortcuts (35) (and Quartz that serve the same purpose in other OSs (34)). These same hooks and Quartz disable tools that permit process management (37) and the clipboard (39). When these security mechanisms have been implanted, the transaction application (311) that the end user wants to work with is presented and this is used to execute the trash generation engine (312), which generates random application and user I/O events in the system. This trash generator is only implanted in PC systems—in other words, Microsoft Windows and devices with a MacOS operating system. It is not implanted in mobile devices because the architecture of these prevents infection. The user therefore has a secure environment for carrying out his electronic transactions.

Figure 4:
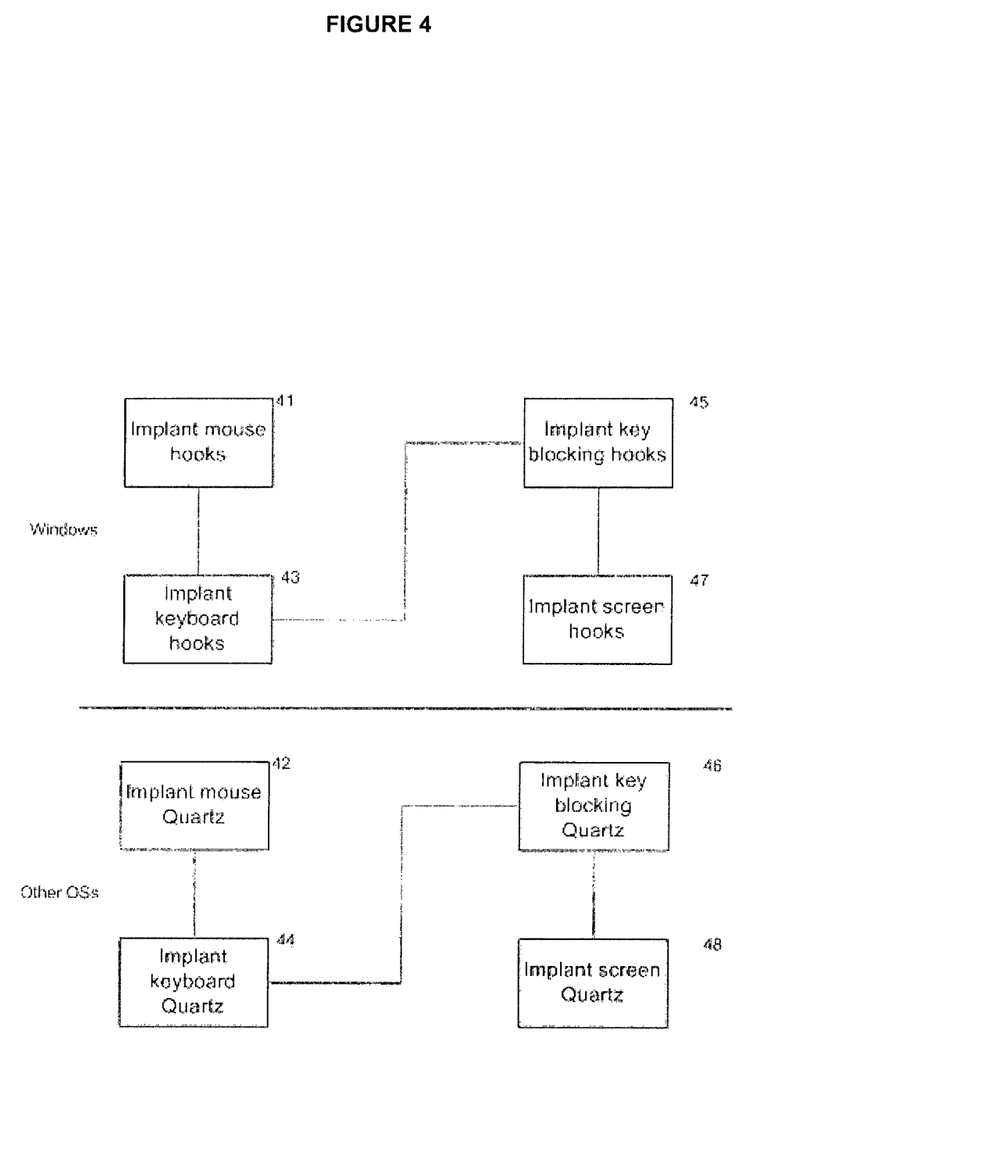
FIG. 4 shows the process for implanting hooks so that messages can be intercepted in the OS, which is part of the isolation process.

Referring to FIG. 4, when the virtual desktop or environment has been created, complementary actions such as implanting hooks (33) and Quartz (32) (see FIG. 3) are performed for execution in the OS message tail. These hooks and Quartz enable messages to be managed at application level for executing cursor (41) (42), keyboard (43) (44), key blocking (45) (46) and screen (47) (48) functions, external devices and system applications. The purpose of installing these hooks and Quartz is so that all messages can be processed first by the new virtual desktop rather than by the user's customary work desktop.

Figure 5:
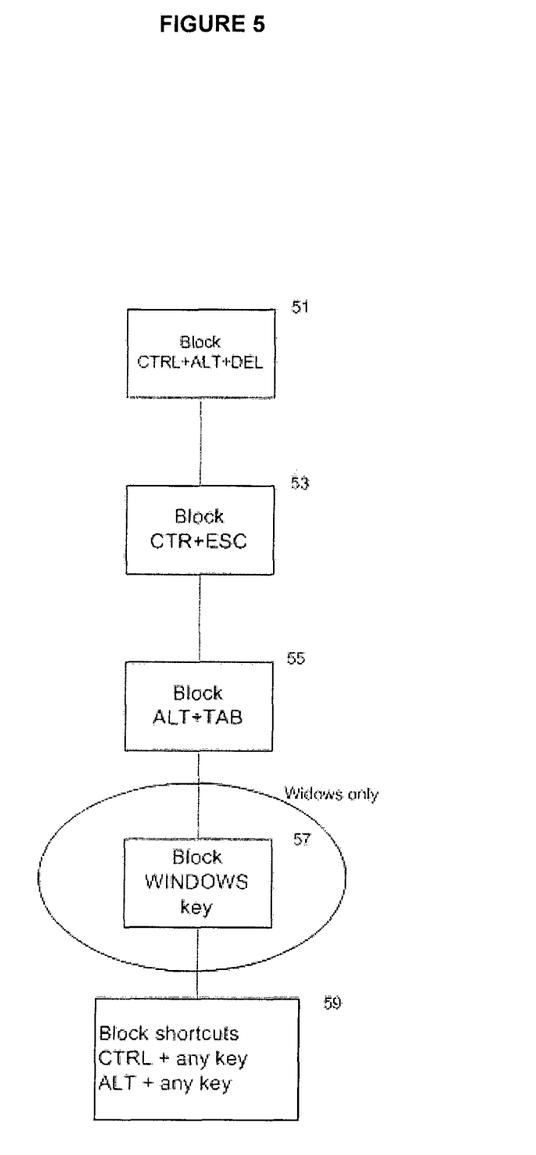
FIG. 5 shows the order in which key blocking hooks should be implanted in the system.

Referring to FIG. 5, when I/O messages are managed in the OS, the use of keyboard commands (45) (46) (see FIG. 4) such as CTRL+ALT+DEL (51), CTRL+ESC (53), CTRL+TAB (55) and WINDOWS KEY (57) are blocked (in Windows systems: this key cannot be blocked in other systems), and by using specific hooks and Quartz for these messages, the execution of undesired computer applications during the exchange process can be prevented.

Referring again to FIG. 3, as the process manager is such an important and powerful tool in the system, it requires further management that involves modifying the kernel, which in the case of Windows, for example, modifies the Windows register. Continuing with the Windows example, an attempt is made to modify the Windows registry codes that enable the process manager to be executed and presented to the end user, and this application is therefore also blocked (37). This further process is carried out in order to overcome the persistent vulnerability in Windows 6 and after, where the CTRL+ALT+DEL combination is a combination of the kernel and where any other application that is not the kernel cannot manage the CTRL+ALT+DEL combination of keys.

Referring again to FIG. 5, for ease of use and to meet non-functional requirements, computer applications generally implements short cuts to function as part of their execution. These accesses are a combination of keys, such as CTRL+P, for example.

The isolated environment provided by the method used in the present invention makes use of the OS APIs, which allow all known and unknown combinations to be blocked in order to get control over execution of the applications that are executed on the isolated environment (59).

Following the sequence in FIG. 3, when the hooking or Quartz engine, depending on the system being executed, has been implemented in the isolated environment, the clipboard service (39) is blocked, or any other services that permit copy-paste events, drag and other access functions for the user, with a view to preventing information used in the transaction from being registered and used subsequently by the user or the screen take over.

By implementing all the techniques described above, a virtual desktop or isolated environment (27) is established (see FIG. 2) that is protected from known information theft threats and where applications in the original user environment continue to function, but do not operate in the new isolated environment (27). The user is provided with the information exchange interface in this virtual desktop or isolated environment, together with the computer application (311) (FIG. 3) where he can carry out the transaction securely (313). In other words, when the isolated environment is executed in its entirety, the user will see the digital form, website or other end user interface that the computer application supplier might want.

The method of the present invention specifies the creation, execution and subsequent destruction of a trash generation engine which creates random events (312) in the system. This engine allows trash events to be created within the isolated or protected environment (27) (see FIG. 2). Thus, if any type of spy or malicious software exists which succeeds in capturing information, it will be difficult for it to differentiate between real and false information. The performance of the device in which the trash generation engine is executed is not affected, since events are not generated on a permanent basis. In other words, when a malicious programme uses this type of method, what it does is generate events like screen-capturing in an unlimited manner, which means that the processor only processes the images taken. In this case, the events that are generated (even though at random) are few and controlled. They are also executed only when the user is exchanging sensitive information with the transaction appliance.

Figure 6:
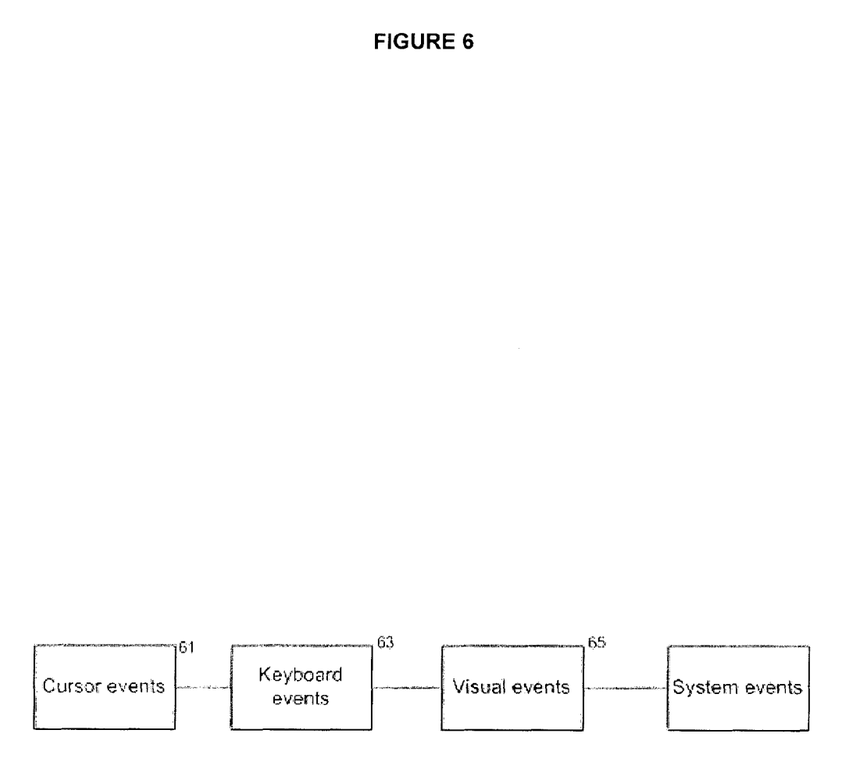
FIG. 6 is a component diagram, which shows the principal events executed by the trash generation engine.

Referring to FIG. 6, the trash generation engine consists of a series of separate functions that allow cursor events to be generated (61), with movements, changes of position and user clicks being registered although it does not carry out any real action in the equipment. There is also a keyboard event generator (63) that simulates the functioning of an external physical keyboard, as if the user were pressing keys. Keyboard use is also registered even if, as in the case of the cursor, the user is not using the device. The generation of visual events (65) such as screen changes or changes in buttons and images that are presented to the user is relevant to preventing attacks from software components like screenloggers or screen grabbers and offences like screen capturing by means of cameras or webcams. Other types of event (67) can also be added to this invention, such as drag and paste or internet page loading. The claimed method can integrate at this point the generation of any event that might be required. Every event not related to the user interface or screen will be invisible to that user; in other words, the user will never know that copy and paste instructions were executed, for example.

Figure 7:
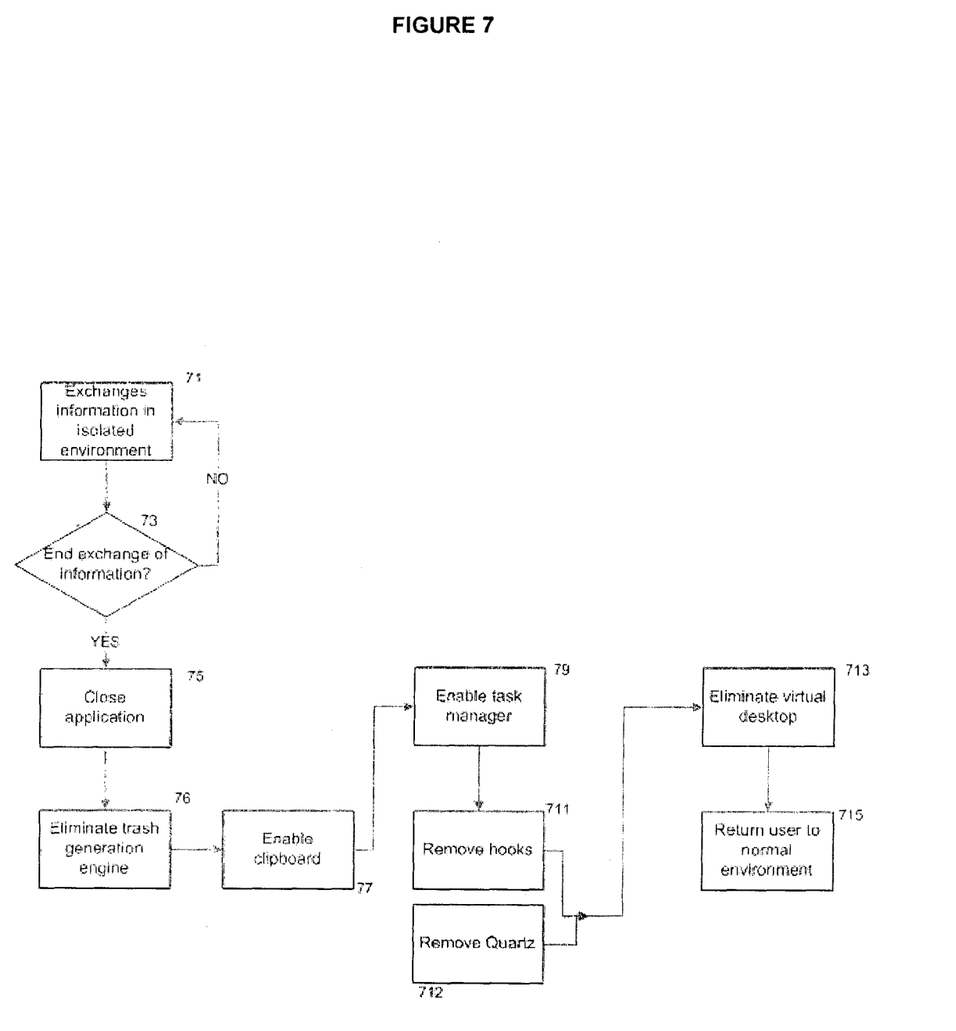
FIG. 7 is a flow diagram of the process for releasing the user's equipment when execution of the isolated arrangement ends.

Referring to FIG. 7, regardless of the result of the transaction at the end of the information exchange (71), the computer application that the user is working with should regain control over all predetermined or default desktop applications and functions. To achieve this, the following should be done: close the application (75), the method used in the invention should automatically eliminate the trash generation engine (76), enable the clipboard (77), enable the process manager in the resident system (79), eliminate all hooking (711) or Quartz (712) infrastructure implemented, depending on the OS, and finally, eliminate the virtual desktop (713). This whole process takes place in a manner that is completely transparent to the user, since there are no messages of any type that allow the user to realise that block functions exist or have been eliminated.

After the user has carried out his transactions under the method of the present invention, he can return to his work (715) without the need to perform complicated processes in order to provide his information with security, and with no sensation of actually doing so.

Figure 8:
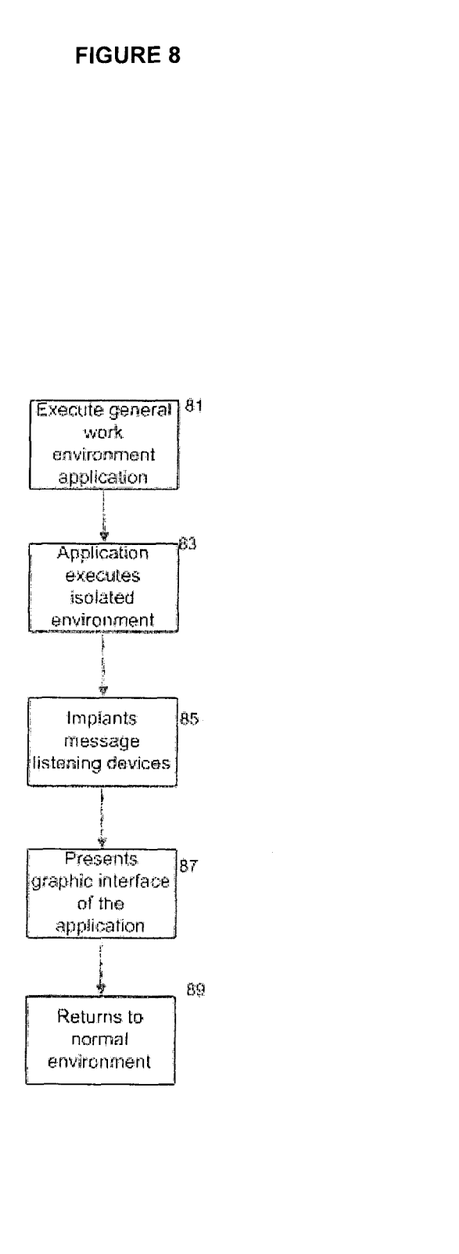
FIG. 8 is a diagram of the components involved when the method is used in a mobile device of the Apple® IOS and Google™ Android type.

FIG. 8 shows the points in time when the different components are executed in order to provide transactions from mobile devices with security. Using his normal work environment (81), the user locates the external application or agent that allows him to perform transaction operations. When this is executed, it establishes an isolated environment or virtual desktop (83) defined by default in the application execution architecture for mobile devices, which does not permit access to the operations of other applications or spy software to intrude on the normal execution of the processes. In order to guarantee an optimum level of security when the agent is being executed, message listening techniques are implanted (85) (referring to the arrangement detailed in FIG. 4). After these techniques have been implanted, the transaction interface is executed (87). This can be a browser that is limited: in other words, the user can only make use of the functions that the application displays, with functionalities inherent in the browser, like forward-back, change URL or open new tab, being prohibited, because only those functionalities displayed by the application are permitted. Finally, when the user wishes to bring execution of his transaction interface to an end, all he needs to do is close the agent or change the application (89).

The method of the present invention is directed to complement the methods already used (e.g. exchanging information through SSL certificates) by suppliers of services like e-commerce, e-learning, SaaS, Cloud computing, etc. to ensure that their end users can make use of their services from any secure or insecure network and from any computing device that is either known or unknown by the user and the company providing the application.

The method of the present invention allows companies to choose any form of delivery, which means that it can be immersed in an executable file that is downloaded from a zone established by the company and housed in the end user's computer equipment. The identity of the control is made secure using code authentication certificates. The preferred embodiment consists on the use of Microsoft Authenticode Sign, if Windows systems are used, or source code validity certificates generated for the developing companies by other manufacturers, such as certified Apple® Developer Certificate. These certificates guarantee that the executable files belong to valid, reliable companies.

The preferred delivery embodiment for the present invention is to construct ActiveX™ Applets™ controls embedded in computer applications and Plug-ins for Safari and executable programmes for Apple® MacOS. These methods should also be given code authentication certificates.

It should be understood that the present invention is not limited to the embodiments or examples described and illustrated, since many variations and modifications are possible without diverging from its spirit, which is only defined in the following claims.

The invention claimed is:

1. A method for carrying out a secure electronic transaction comprising:
 a) initiating a computer client application on an Operating System (OS);
 b) initiating an isolated environment on the OS by implementing an Application Programming Interface (API), wherein the API isolates the OS so that the isolated environment communicates only with the client application; the API controls the requests, all the message traffic and services generated to the OS as demanded by the client application;
 c) implementing hooking and quartz techniques in the isolated environment in a manner that is transparent to the secure Client Application, which include an OS function selected from the group consisting of:
 i) inactivation of the OS' native clipboard service, and
 ii) inactivation of the OS' process manager;
 d) executing the Client Application under the isolated environment wherein the isolated environment communicates only with the Client Application, and wherein the secure Client Application cannot access functions of other applications; and
 e) finalizing the isolated environment by eliminating all components used in establishing the secure environment and activating the native OS functions.

2. The method of claim 1, wherein the hooking and quartz techniques in step (c) also include an OS function selected from the group consisting of:
 i) data messages between the OS and the Application:
 ii) blocking special key combinations native to the OS;
 iii) blocking quick accesses native to the OS and to client applications.

3. The method of claim 2, wherein the data messages between the OS and the Application include I/O functions.

4. The method of claim 3, wherein the I/O functions are services between the OS and any external device.

5. The method of claim 2, wherein management of blocking functions (ii) and (iii) is executed in the OS message queue.

6. The method of claim 2, wherein blocking functions (ii) and (iii) are aimed at blocking cursor, keyboard and screen functions, external devices and system applications.

7. The method of claim 2, wherein blocking functions (ii) and (iii) are for blocking touch screen functions.

8. The method of claim 4, wherein the I/O functions in the OS block the use of key combinations.

9. The method of claim 8, wherein the key combinations can be from the following selected group: CTRL, ALT, SHIFT, TAB, ESC, DEL and WINDOWS KEY.

10. The method of claim 1, wherein a trash generation step also occurs before step (d).

11. The method of claim 10, wherein the trash events include random I/O, application and system user functions.

12. The method of claim 11, wherein the trash events include cursor events that simulate movements, changes of position and generation of clicks by a user.

13. The method of claim 10, wherein the trash events simulate the functioning of a physical, external keyboard, as if a user were pressing keys.

14. The method of claim 11, wherein the trash events simulate generation of visual events such as screen changes and changes in the secure Client Application's images and buttons.

15. The method of claim 1, wherein no other application being executed in the OS can interact with the secure Client Application.

16. The method of claim 1, wherein step (e) of finalizing the isolated environment includes eliminating the software components implemented.

17. The method of claim 10, wherein step (e) of finalizing the isolated environment also eliminates a trash generation engine.

\* \* \* \* \*